United States Patent
Shirvanian et al.

(10) Patent No.: US 8,916,313 B2
(45) Date of Patent: Dec. 23, 2014

(54) FUEL CELL

(75) Inventors: Alireza Pezhman Shirvanian, Ann Arbor, MI (US); James Anthony Adams, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 969 days.

(21) Appl. No.: 12/504,044

(22) Filed: Jul. 16, 2009

(65) Prior Publication Data

US 2011/0014538 A1 Jan. 20, 2011

(51) Int. Cl.
*H01M 8/02* (2006.01)

(52) U.S. Cl.
CPC .......... *H01M 8/0254* (2013.01); *H01M 8/0228* (2013.01); *H01M 8/0234* (2013.01); *H01M 8/0232* (2013.01); *H01M 8/0245* (2013.01); *Y02E 60/50* (2013.01)
USPC .......................................... 429/514; 429/512

(58) Field of Classification Search
CPC . H01M 8/023; H01M 8/0245; H01M 8/0232; H01M 8/0234
USPC .......................................... 429/457, 512, 514
See application file for complete search history.

(56) References Cited

U.S. PATENT DOCUMENTS

| | | |
|---|---|---|
| 5,252,410 A | 10/1993 | Wilkinson et al. |
| 5,300,370 A | 4/1994 | Washington et al. |
| 5,641,586 A | 6/1997 | Wilson |
| 6,207,312 B1 | 3/2001 | Wynne et al. |
| 6,232,010 B1 | 5/2001 | Cisar et al. |
| 6,280,870 B1 | 8/2001 | Eisman et al. |
| 6,472,095 B2 | 10/2002 | Margiott |
| 6,485,857 B2 | 11/2002 | Perry et al. |
| 6,686,084 B2 | 2/2004 | Issacci et al. |
| 6,770,394 B2 | 8/2004 | Appleby et al. |
| 6,780,533 B2 | 8/2004 | Yi et al. |
| 6,794,077 B2 | 9/2004 | Yi et al. |
| 6,828,054 B2 | 12/2004 | Appleby et al. |
| 6,893,770 B2 | 5/2005 | Rock |
| 6,991,869 B2 | 1/2006 | Cisar et al. |
| 2001/0004501 A1 | 6/2001 | Yi et al. |
| 2001/0041281 A1 | 11/2001 | Wilkinson et al. |
| 2002/0028372 A1 | 3/2002 | Ohlsen et al. |
| 2003/0124413 A1 | 7/2003 | Bai et al. |
| 2003/0129468 A1 | 7/2003 | Issacci et al. |
| 2005/0048351 A1 | 3/2005 | Hood et al. |
| 2005/0181264 A1 | 8/2005 | Gu et al. |

(Continued)

OTHER PUBLICATIONS

Los Alamos National Laboratory, Fuel Cell With Interdigitated Porous Flow-Fields, Abstract, printed Jun. 26, 2008 from www.lanl.gov.

(Continued)

*Primary Examiner* — Milton I Cano
*Assistant Examiner* — Stephen Yanchuk
(74) *Attorney, Agent, or Firm* — Damian Porcari; Brooks Kushman P.C.

(57) ABSTRACT

A fuel cell includes a catalyst layer, a corrugated plate forming a plurality of channels that define a flow field in fluid communication with the catalyst layer, and a coating on at least one of the channels. The plate and coating are configured such that, if a gas flows through the channels, an obstruction blocking the at least one of the channels causes a pressure gradient between the channels that drives convection of the gas through the coating and around the obstruction.

17 Claims, 3 Drawing Sheets

(56) References Cited

U.S. PATENT DOCUMENTS

| | | |
|---|---|---|
| 2005/0244699 A1 | 11/2005 | Shimoi et al. |
| 2007/0172720 A1 | 7/2007 | Mogi et al. |
| 2008/0044715 A1 | 2/2008 | Vyas et al. |
| 2008/0102347 A1 | 5/2008 | Blunk |
| 2008/0113254 A1 | 5/2008 | Christie et al. |
| 2010/0040926 A1* | 2/2010 | Blanchet et al. ............... 429/30 |

OTHER PUBLICATIONS

Carcadea, E., et al., A Computational Fluid Dynamics Analysis of a PEM Fuel Cell System for Power Generation, International Journal of Numerical Methods for Heat & Fluid Flow, vol. 17 No. 3, 2007, pp. 302-312.

* cited by examiner

FUEL CELL

BACKGROUND

Referring to FIG. 1, a prior art fuel cell 10 includes a membrane electrode assembly (MEA) 12 sandwiched between a pair of flow field plates 14, 16. The MEA 12 includes a proton exchange membrane (PEM) 18 and catalyst layers 20, 22 bonded to opposite sides of the PEM 18. The MEA 12 further includes gas diffusion layers 24, 26 (anode, cathode respectively) each in contact with one of the catalyst layers 20, 22. As apparent to those of ordinary skill, the gas diffusion layer 24 and catalyst layer 20 may be collectively referred to as an electrode. Likewise, the gas diffusion layer 26 and catalyst layer 22 may also be collectively referred to as an electrode.

The flow field plate 14 includes at least one channel 28n. As known in the art, the at least one channel 28n may form a spiral, "S," or other shape on the face of the flow field plate 14 adjacent to the anode 24. Hydrogen from a hydrogen source (not shown) flows through the at least one channel 28n to the anode 24. The catalyst layer 20 promotes the separation of the hydrogen into protons and electrons. The protons migrate through the PEM 18. The electrons travel through an external circuit 30.

The flow field plate 16 also includes at least one channel 32n. Similar to the at least one channel 28n, the at least one channel 32n may form a spiral, "S," or other shape on the face of the flow field plate 16 adjacent the cathode 26. Oxygen from an oxygen or air source (not shown) flows through the at least one channel 32n and to the cathode 26. The protons (generated as a result of hydrogen oxidation) that migrate through the PEM 18 combine with the oxygen and electrons returning from the external circuit 30 to form water and heat.

As known in the art, any suitable number of fuel cells 10 may be combined to form a fuel cell stack (not shown). Increasing the number of cells 10 in a stack increases the voltage output by the stack. Increasing the surface area of the cells 10 in contact with the MEA 12 increases the current output by the stack.

SUMMARY

A fuel cell includes a catalyst layer, a corrugated plate forming a plurality of channels that define a flow field in fluid communication with the catalyst layer, and a coating on at least one of the channels. The plate and coating are configured such that, if a gas flows through the channels, an obstruction blocking the at least one of the channels causes a pressure gradient between the channels that drives convection of the gas through the coating and around the obstruction.

A fuel cell includes a catalyst layer, a plate having a plurality of channels formed therein that define a flow field in fluid communication with the catalyst layer, and a porous matrix deposited on at least a portion of the plate. The plate and porous matrix are configured such that, if a gas flows through the channels, an obstruction blocking a particular channel causes a pressure gradient between the channels that drives convection of the gas through the coating and around the obstruction.

A fuel cell includes a plate having a surface defining a plurality of channels, a layer disposed on at least a portion of the surface and having a porosity between 0.20 and 0.99, and a catalyst in fluid communication with the channels. The plate and layer are configured such that, if a gas flows through the channels, an obstruction blocking a particular channel causes a pressure gradient between the channels that drives convection of the gas through the coating and around the obstruction.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Wider landing areas may increase cell conductivity and enhance electric current collection at an MEA. Inner areas of wider landing areas in nonporous flow fields, however, may suffer from reactant starvation due to relatively large reactant gas diffusion paths from the flow channels. Certain embodiments disclosed herein may enhance reactant distribution to catalysts, even with wider landing areas, resulting in improved fuel cell performance.

Stagnant zones may form in flow field channels downstream of obstructions. Such stagnant zones may impact MEA durability. Certain embodiments disclosed herein may prevent the formation of stagnant zones by permitting reactants to flow around any obstructions resulting in improved MEA durability.

Manifolds may have imperfections that affect the uniform distribution on reactants. As discussed below, certain embodiments may enhance reactant distribution to catalysts resulting in improved fuel cell performance.

Figure 2:
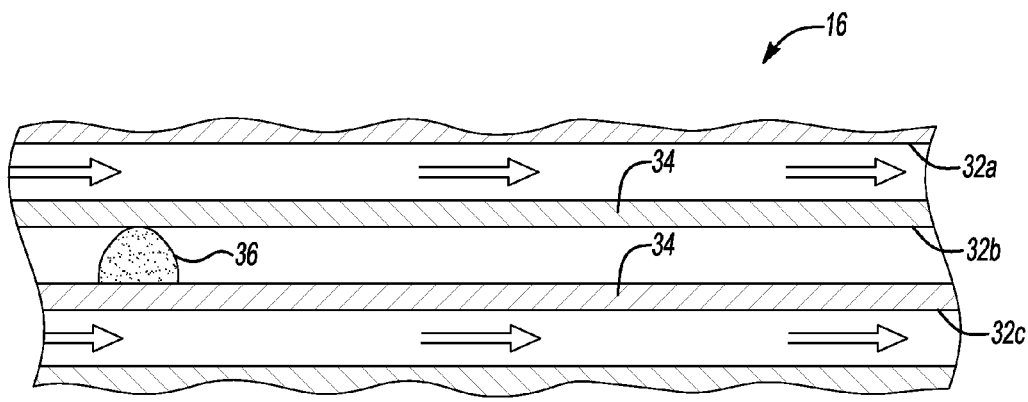
FIG. 2 is a plan view, in cross-section, of a flow field plate of FIG. 1.

Referring now to FIG. 2, the flow field plate 16 includes several parallel channels 32n (32a, 32b, 32c). The channels 32n are separated by wall portions 34. In the illustration of FIG. 2, the flow of oxygen (air) is indicated by arrow.

Figure 1:
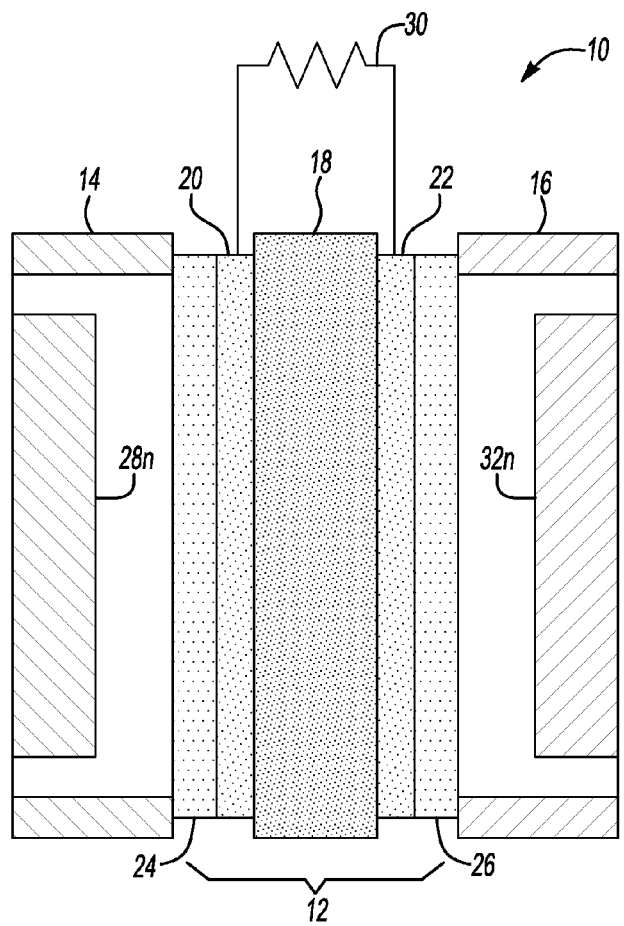
FIG. 1 is a side view, in cross-section, of a prior art fuel cell.

An obstruction 36 has blocked the entire cross-section of the channel 32b, thus obstructing the flow of oxygen downstream of the obstruction 36. This may affect the durability of the fuel cell 10 illustrated in FIG. 1, may cause non-uniform distribution of reactants to the channels 32n, may cause non-uniform current generation by the fuel cell 10, and/or may affect the performance and durability of the fuel cell 10.

Figure 3:
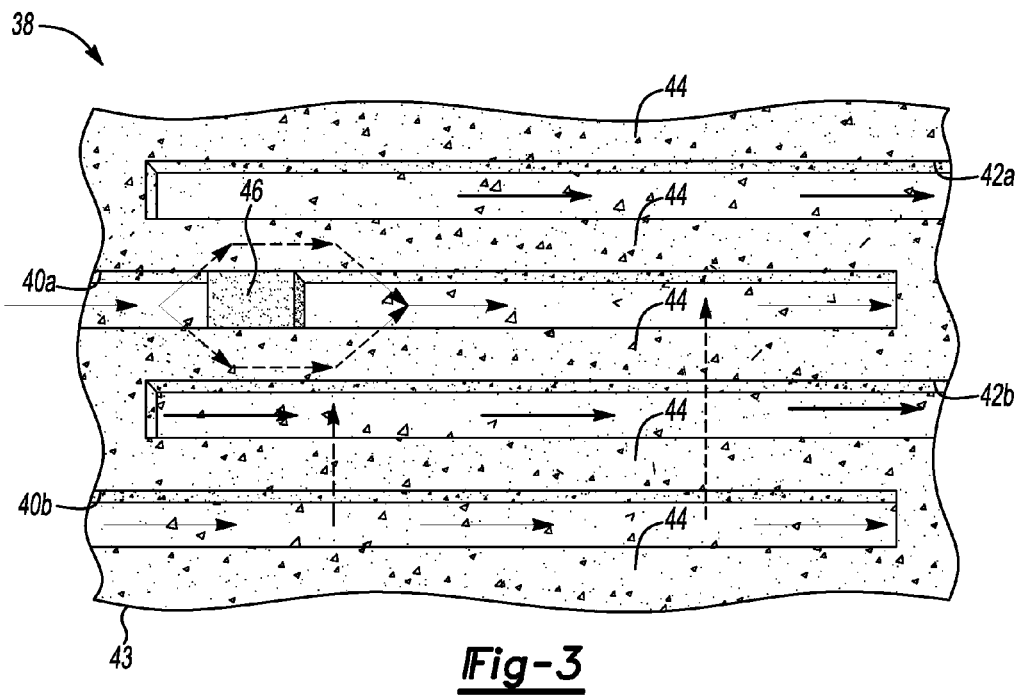
FIG. 3 is a perspective view of a flow field plate according to an embodiment of the invention.

Referring now to FIG. 3, an embodiment of an interdigitated flow field plate 38 includes inlet channels 40n (40a, 40b) and outlet channels 42n (42a, 42b) formed in a porous bulk media 43. Wall portions 44 separate the channels 40n, 42n.

Gases flowing into the inlet channels 40n (as indicated by light solid arrowed lines) may convect and/or diffuse through either or both of (1) the bulk media 43 (as indicated by dashed arrowed lines) and (2) an MEA (not shown) in contact with the plate 38, and out of the outlet channels 42n (as indicated by heavy solid arrowed lines). As known in the art, pressure gradients drive convection whereas concentration gradients drive diffusion.

Convection may be the primary mechanism by which gasses move through the bulk media 43. This convection may improve the distribution of gases to the MEA (not shown), as well as reduce the pressure needed to flow gases into the inlet channels 42$n$ as compared with non-porous interdigitated flow fields. (High pressures are generally needed to flow gasses through the restricted flow path provided by a gas diffusion layer associated with a non-porous interdigitated flow field.) A reduction in pressure may reduce the amount of power needed to facilitate operation of the fuel cell in which the plate 38 is disposed.

Serpentine, "S" shaped, non-interdigitated, etc. channel configurations may be used in other embodiments. Pressure gradients within these embodiments (in the absence of channel obstructions) may be generally less than those within interdigitated embodiments. Diffusion, therefore, may be the primary mechanism by which gases move through the bulk media 43 in the absence of channel obstructions. In the presence of channel obstructions, however, convection may be the primary mechanism by which gases move through the bulk media 43.

An obstruction 46 has filled the entire cross-section of the channel 40$a$ as illustrated in FIG. 3. The porosity (which may range, for example, from 0.01 to 0.99) and tortuosity (which may be at least 1) of the plate 38, however, is such that gases upstream of the obstruction 46 convect through the wall portions 44 defining the channel 40$a$, as well as other portions of the bulk media 43 (as indicated by dashed arrowed lines), because of the pressure gradient within the channel 40$a$ setup by the obstruction 46. This convection may restore gas flow downstream of the obstruction 46 as illustrated. Gases may also diffuse through the wall portions 44 defining the channel 40$a$, as well as other portions of the bulk media 43, because of concentration gradients between the channels 40$n$, 42$n$.

In other embodiments, the channels 40$n$, 42$n$ (and/or plate 38) may be coated with various substances. For example, the channels 40$n$ may be coated with Teflon and the channels 42$n$ may be coated with a metal to alter the surface texture of pores within the channels 40$n$, 42$n$. Of course, other coatings may also be used.

Several experiments were conducted to evaluate the performance of certain embodiments. Serpentine flow fields (5 cm$^2$) formed in both porous (61% total porosity and 95% open porosity) and nonporous (graphite) plates, as well as interdigitated flow fields (5 cm$^2$) formed in porous plates, were tested with woven gas diffusion electrodes having 5 grams of platinum nanoparticles per square meter and NAFION 117 membranes.

In a first experiment, the nonporous flow fields were used on both the anode and cathode sides of the cell. In a second experiment, the nonporous flow field was used on the anode side, while the serpentine porous flow field was used on the cathode side of the cell. In a third experiment, the nonporous flow field was used on the anode side, while the interdigitated porous flow field was used on the cathode side of the cell.

The cells were pre-conditioned by running them for 24 hours subject to room temperature at 0.5 volts with 1000 sccm air/300 sccm hydrogen at 100% relative humidity. This was followed by 4 hours of operation at an elevated temperature (70° C.) with all other parameters kept the same.

The effective current collector area for the tested porous flow fields was less than the current collector area for the nonporous flow field. As a result, the active area was normalized with the porosity of the plates to better assess the performance of the cells equipped with porous flow fields.

Figure 4:
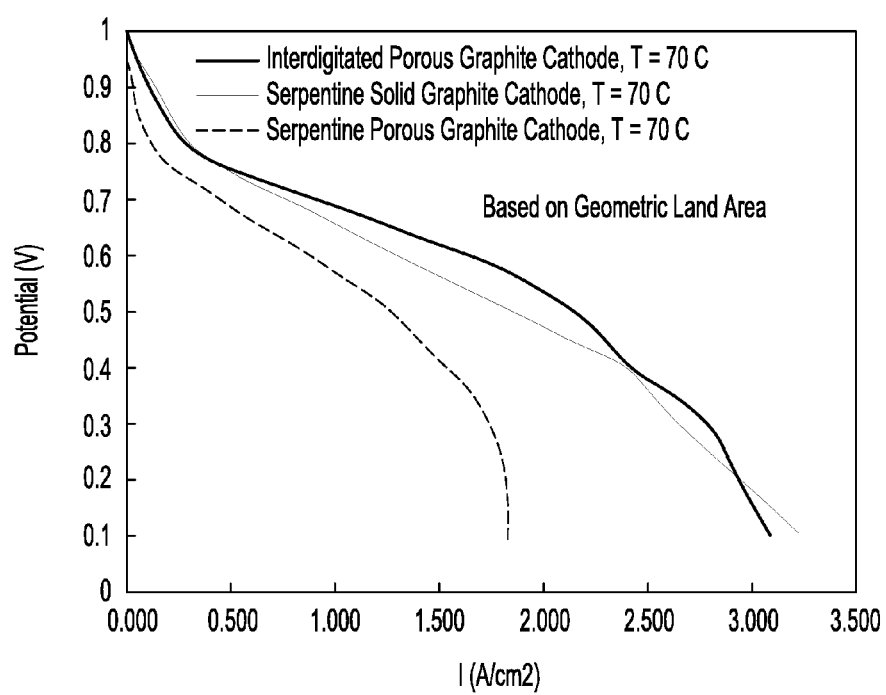
FIG. 4 is a plot of experimental polarization curves for a serpentine nonporous cathode-side flow field, and serpentine and interdigitated porous cathode-side flow fields at 70° C. based on geometric land area.
Figure 5:
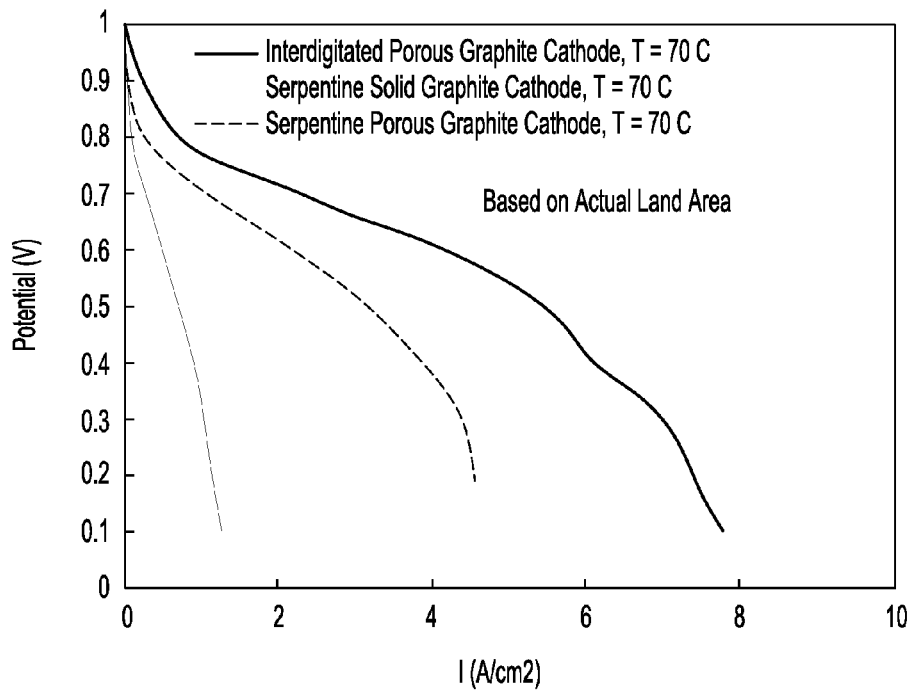
FIG. 5 is a plot of experimental polarization curves for a serpentine nonporous cathode-side flow field, and serpentine and interdigitated porous cathode-side flow fields at 70° C. based on actual land area.

Referring now to FIGS. 4 and 5, the polarization curves reveal that while the serpentine nonporous cathode-side flow field appears to have a greater capacity to generate power relative to the serpentine porous cathode-side flow field based on geometric area, the serpentine and interdigitated porous cathode-side flow fields appear to have a greater capacity to generate power based on actual land area.

Multiphase computational fluid dynamic simulations were performed to study the dynamics of fluid flow within a single cathode-side channel, and within a cathode-side channel of a serpentine flow field. In the simulations, the channel dimensions (taken from a 5 cm$^2$ serpentine flow field) were 787.4× 1016 microns. The flow rate (2e−5 kg/sec) was set according to the value used in the experiments detailed above. A hydrophilic media (contact angle=75°) with a surface tension of 0.07213 N/m was assumed for the single channel simulation, while a hydrophobic media (contact angle=133°) was assumed for the channel of the serpentine flow field simulation. The porosity was set to 0.61 with a permeability of 1e−9 m$^2$.

An examination of the time evolution of reactant flow (as represented by contours of reactant velocity along and perpendicular to the landing area) under circumstances where a 1 mm thick obstruction has blocked the entire cross-section of both the single cathode-side channel and the cathode-side channel of the serpentine flow field revealed that reactants begin to flow through the porous matrix and around the obstruction after 5e−5 sec in both cases, thereby avoiding starvation downstream of the obstruction.

Figure 6:
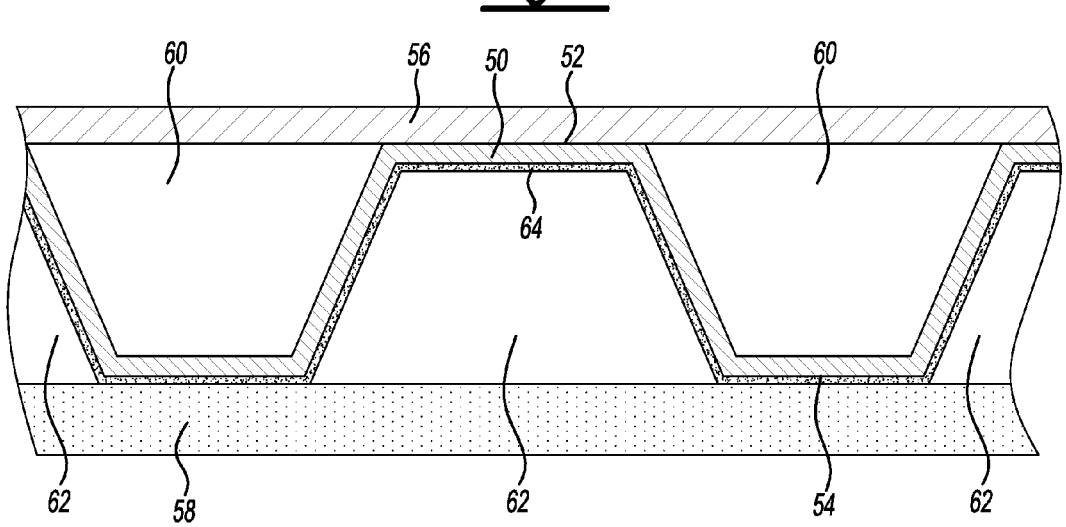
FIG. 6 is an end view, in cross-section, of a portion of a fuel cell according to another embodiment of the invention.

Referring now to FIG. 6, an embodiment of a fuel cell 48 includes a corrugated flow field plate 50 having opposing surfaces 52, 54, a contact plate 56 in contact with, and sealed against, portions of the surface 52, and an MEA 58. The corrugated plate 50 and contact plate 56 define a plurality of channels 60 though which a coolant, such as water, may flow. The corrugated plate 50 and MEA 58 define a plurality of channels 62 through which a fuel, reactant, etc., may flow.

A porous matrix or coating, e.g., graphite, porous carbon, porous metal, etc., 64 (having a porosity and tortuosity similar to that described above) has been deposited on the surface 54 of the corrugated plate 50. (The MEA 58 is in contact with, and sealed against portions of the coating 64.) This matrix 64 forms a porous layer through which gases flowing through the channels 62 may convect (and/or diffuse) in the presence of an obstruction as described herein. For example, an obstruction blocking one of the channels 62 may set up a pressure gradient between the channels 62 that drives convection of gases through the coating 64 in the vicinity of the obstruction, and around the obstruction thereby reestablishing flow of gases downstream of the obstruction.

The layer 64 may be thicker or thinner than the gas diffusion layer of the MEA 58. For example, the layer 64 may have a thickness of 120 μm, or larger/smaller depending on, for example, the material used for the coating 64 and/or other design considerations. Any suitable thickness, however, may be used.

In other embodiments, different coatings 64 may be applied to different portions of the surface 54. As an example, a coating having a relatively low porosity may be applied to those portions of the surface 54 that are in contact with the MEA 58 (i.e., the landing area), while a coating having a relatively high porosity may be applied to those portions of the surface 54 that define the channels 62, etc. As another example, certain portions of the surface 54 may be masked prior to the application of the coating 64 so that the masked portions of the surface 54 are not coated. Other configurations are also possible. For example, a porous matrix or coating may be applied to flow field plates similar to that described with reference to FIG. 1, 2 or 3, or similar to that tested and discussed with reference to FIGS. 4 and 5, etc.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A fuel cell comprising:
a catalyst layer;
a corrugated plate forming channels defining a flow field fluidly communicating with the catalyst layer; and
a coating on at least one of the channels, the plate and coating configured such that, if a gas flows through the channels, an obstruction blocking the at least one of the channels causes a pressure gradient between the channels driving convection of the gas through the coating and around the obstruction.

2. The fuel cell of claim 1 further comprising a gas diffusion layer in fluid communication with the flow field, wherein the coating has a thickness less than a thickness of the gas diffusion layer.

3. The fuel cell of claim 1 further comprising a gas diffusion layer in fluid communication with the flow field, wherein the coating has a thickness greater than a thickness of the gas diffusion layer.

4. The fuel cell of claim 1 wherein the coating comprises at least one of graphite, porous carbon, and porous metal.

5. The fuel cell of claim 1 wherein the coating has a porosity between 0.01 and 0.99.

6. The fuel cell of claim 5 further comprising another coating on other of the channels having a porosity different than the coating on the at least one of the channels.

7. The fuel cell of claim 1 wherein the coating has a tortuosity of at least 1.

8. A fuel cell comprising:
a catalyst layer;
a plate having a plurality of discrete channels formed therein that define a flow field in fluid communication with the catalyst layer; and
a porous matrix deposited on at least a portion of the plate, wherein the plate and porous matrix are configured such that, if a gas flows through the channels, an obstruction blocking a particular channel causes a pressure gradient between the channels that drives convection of the gas through the coating and around the obstruction.

9. The fuel cell of claim 8 wherein the porous matrix comprises at least one of graphite, porous carbon, and porous metal.

10. The fuel cell of claim 8 wherein the porous matrix has a porosity between 0.01 and 0.99.

11. The fuel cell of claim 8 wherein the porous matrix has a tortuosity of at least 1.

12. The fuel cell of claim 8 further comprising another porous matrix deposited on other portions of the plate and having a porosity different than the porous matrix deposited on the at least a portion of the plate.

13. A fuel cell comprising:
a plate having a surface defining a plurality of discrete channels;
a layer disposed on at least a portion of the surface and having a porosity between 0.20 and 0.99; and
a catalyst in fluid communication with the channels, wherein the plate and layer are configured such that, if a gas flows through the channels, an obstruction blocking a particular channel causes a pressure gradient between the channels that drives convection of the gas through the coating and around the obstruction.

14. The fuel cell of claim 13 wherein the layer comprises at least one of graphite, porous carbon, and porous metal.

15. The fuel cell of claim 13 wherein the layer has a tortuosity of at least 1.

16. The fuel cell of claim 13 further comprising another layer disposed on other portions of the surface and having a porosity different than the layer disposed on the at least a portion of the surface.

17. The fuel cell of claim 13 wherein the layer has a thickness greater than a thickness of the catalyst.

* * * * *